United States Patent [19]
Rice

[11] 3,750,494
[45] Aug. 7, 1973

[54] ROTARY INDEXING TABLE

[75] Inventor: Edwin E. Rice, Ann Arbor, Mich.

[73] Assignee: Chemotronics International, Inc., Ann Arbor, Mich.

[22] Filed: Nov. 5, 1971

[21] Appl. No.: 196,128

[52] U.S. Cl. ............................................... 74/820
[51] Int. Cl. ............................................. B23b 29/32
[58] Field of Search ............................... 74/820, 827

[56] References Cited
UNITED STATES PATENTS

| | | | |
|---|---|---|---|
| 3,153,952 | 10/1964 | Thoma | 74/820 X |
| 3,248,953 | 5/1966 | Holper et al. | 74/820 X |
| 3,207,007 | 9/1965 | Jennings | 74/820 |
| 2,903,914 | 9/1959 | Tarzian | 74/820 |

Primary Examiner—Charles J. Myhre
Assistant Examiner—F. D. Shoemaker
Attorney—Winston E. Miller et al.

[57] ABSTRACT

An improved rotary indexing table of the Geneva type having an outboard or relatively perimetric locking during dwell and in which all table forces are isolated during dwell from stress on the drive mechanism. The drive members through an arc of somewhat more than 180° achieve an indexing path act and provide a lock trace path holding the table firm during any dwell stations and wherein the lock is effective through a drive arc somewhat less than 180°.

3 Claims, 8 Drawing Figures

INVENTOR.
EDWIN E. RICE

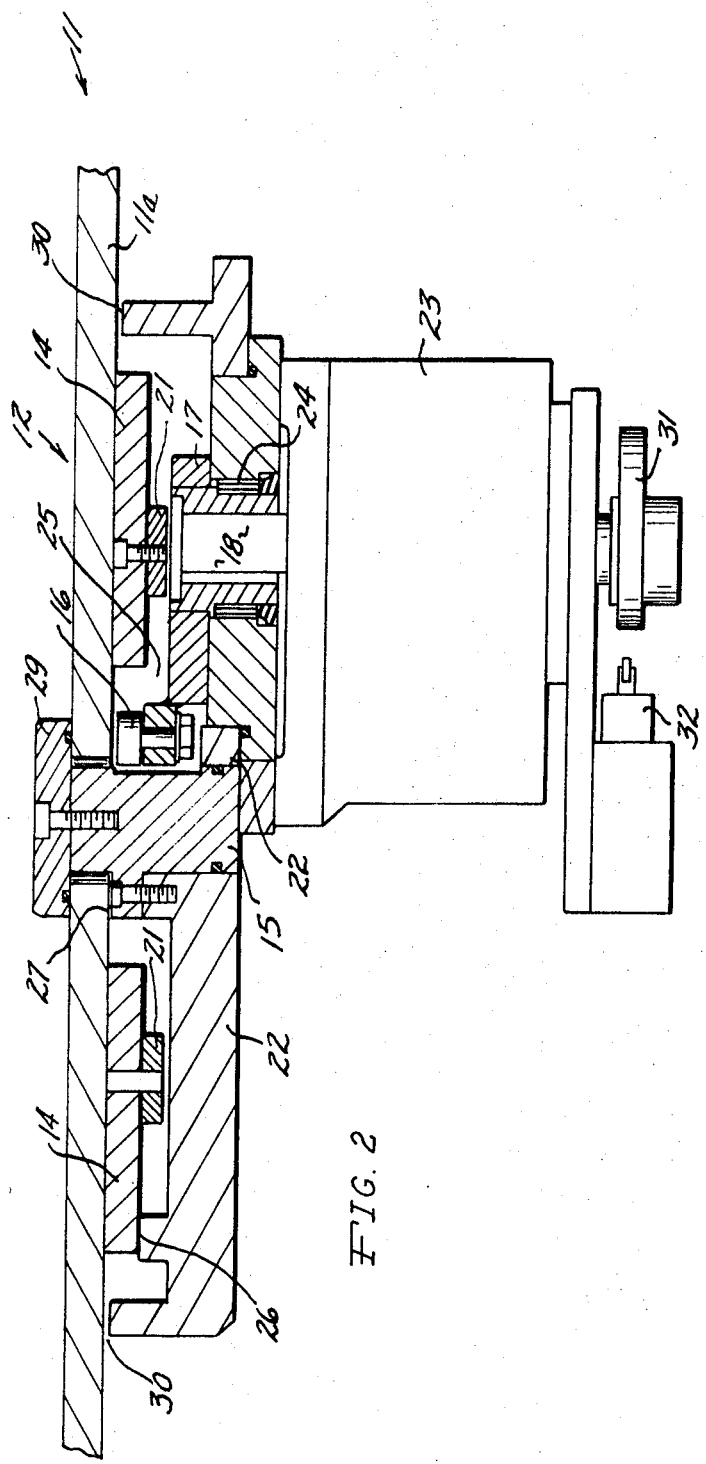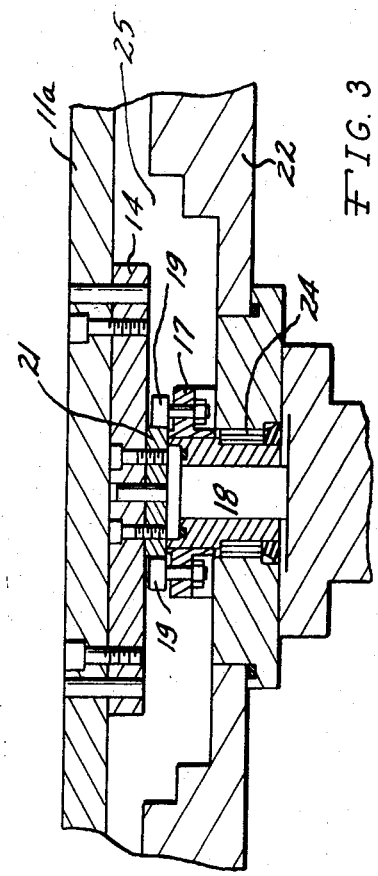

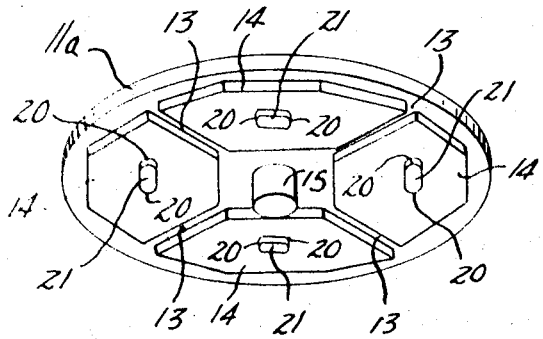
FIG. 4
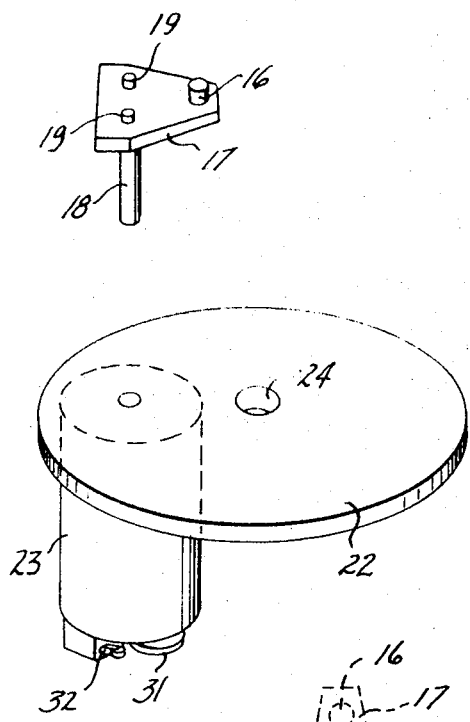
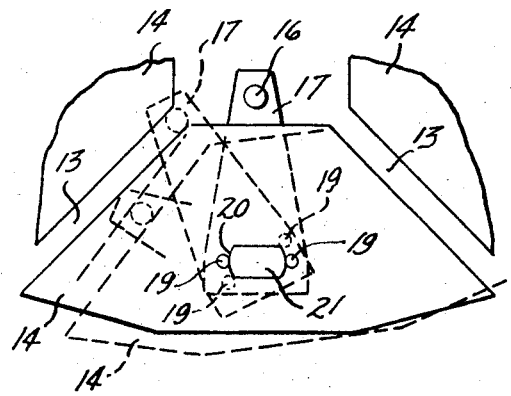
FIG. 5
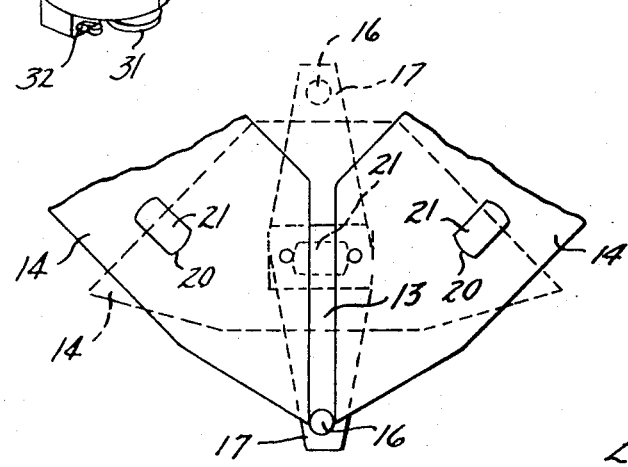
FIG. 6

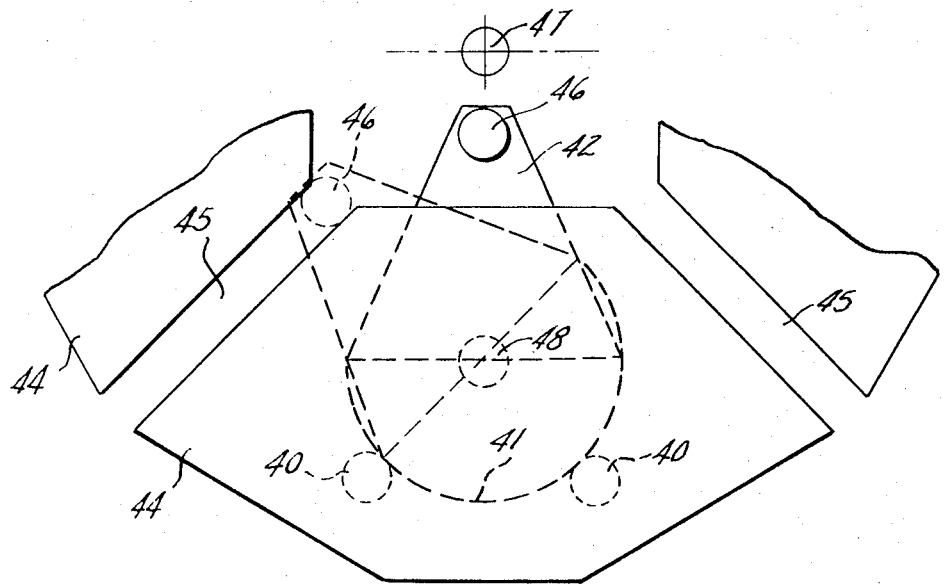
FIG. 7
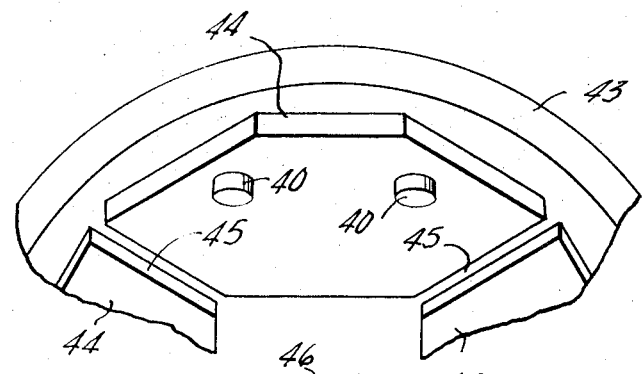
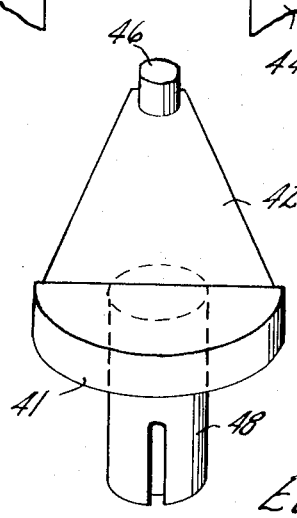
FIG. 8
INVENTOR
EDWIN E. RICE
ATTORNEYS

ROTARY INDEXING TABLE

The present invention is an indexing table of the Geneva type in which a plurality of work stations are repetitively moved through 360° of travel and are presented successively to dwell at one or more relatively stationary positions so that operations, adjustments, loading work, or manipulation can occur at each station.

Many devices are known which are of this general type. Examples are to be found in the U. S. Pat. Nos. 1,975,008 and 2,011,486 to Kingsbury; 2,021,030 to Schwenberg; 2,757,559 to Carpenter; and 3,413,874 to Arnold.

In general, Geneva type tables must operate with considerable precision and the precision must be repetitious in each of the plural stations through the entire 360° of travel and at each individual work station. Further, the table must lock to avoid inertial wear since the mass of metal comprising table and tooling must stop and remain stationary during the station "dwell." Further, if locking can be accomplished adjacent the perimeter of the table a substantially stronger block to inertial overrun and inherent greater accuracy exist. To accomplish this, however, adjustments in table geometry are required and hopefully without increasing the table complexity. Many Geneva type tables utilize shot pin stops which insert, for example, radially or vertically in stop openings or slots and which receive repeated and damaging inertial shock. As will be appreciated, if the table functions at any substantial speed the wear on such pins, usually tapered, is considerable. Accordingly, substantial and extensive effort has been expended to effectively lock the table at each station between arcuate moves and in such a manner as to avoid inertial shock, assure repetitive accuracy of locating, and to do this without extensive complexity of the table, its drive, or without elaborate collateral braking provisions.

Accordingly, the principle object of the present invention is to provide a new and improved indexing Geneva type table.

Another object is to provide a very positive indexing path for repetitive successive angular movement and a very positive lock trace path followed during the dwell sequence whereby the table is positively secured against movement and in avoidance of braking strain on the table drive mechanism.

Another object is to shift the lock trace path toward the outer perimeter of the table and thus provide a very positive barrier achieved in a smooth transition at a greater effective radius so that the table is under constant control.

Still another object is to provide an overall simple table usable with wide numbers of stations and which secures and maintains repetitive accuracy despite its simplicity. Corallaries to this object are ease of maintenance and repair, adaptability to a wide variety of machine adjuncts, and extended table and drive life.

Other objects will be appreciated by those skilled in the art as the description proceeds.

IN THE DRAWINGS

FIG. 2 is a cross section elevation view taken on the line II—II of FIG. 1 and showing the simplicity of construction and the drive structure and limit switch arrangement engagable by the cam on the drive shaft.

FIG. 3 is a cross section elevation view taken on the line III—III of FIG. 1 and indicating the engaged roller locks retaining the table top from angular displacement.

FIG. 4 is a somewhat schematic exploded view of the principal elements in the indexing table of the present invention. Without journalling illustrated these comprise the table top, cam blocks, the drive lock and index cam head, the table base and supportive journalling, and the drive structure for rotating the drive lock and index cam head.

FIG. 5 is a plan view development diagram indicating the operation of the table as the drive head moves from lock position to unlock position and then to rotary motion translation in the radial indexing paths between cam blocks so that control over the table is present at any position of the drive head.

FIG. 6 is a plan view development diagram as in FIG. 5 but indicating that the drive arm has completed 180° of travel on its drive axis.

FIG. 7 is a modified plan view development of a variation in the present invention when the drive element includes a surface concentric about its axis of rotation and engagable with straddling lock surfaces during the dwell portion of one drive revolution.

FIG. 8 is a partially exploded perspective view of the structure shown in FIG. 7 better indicating the form of the depending lock surfaces engagable with the arcuate portion of the drive head.

GENERAL DESCRIPTION

Figure 1:
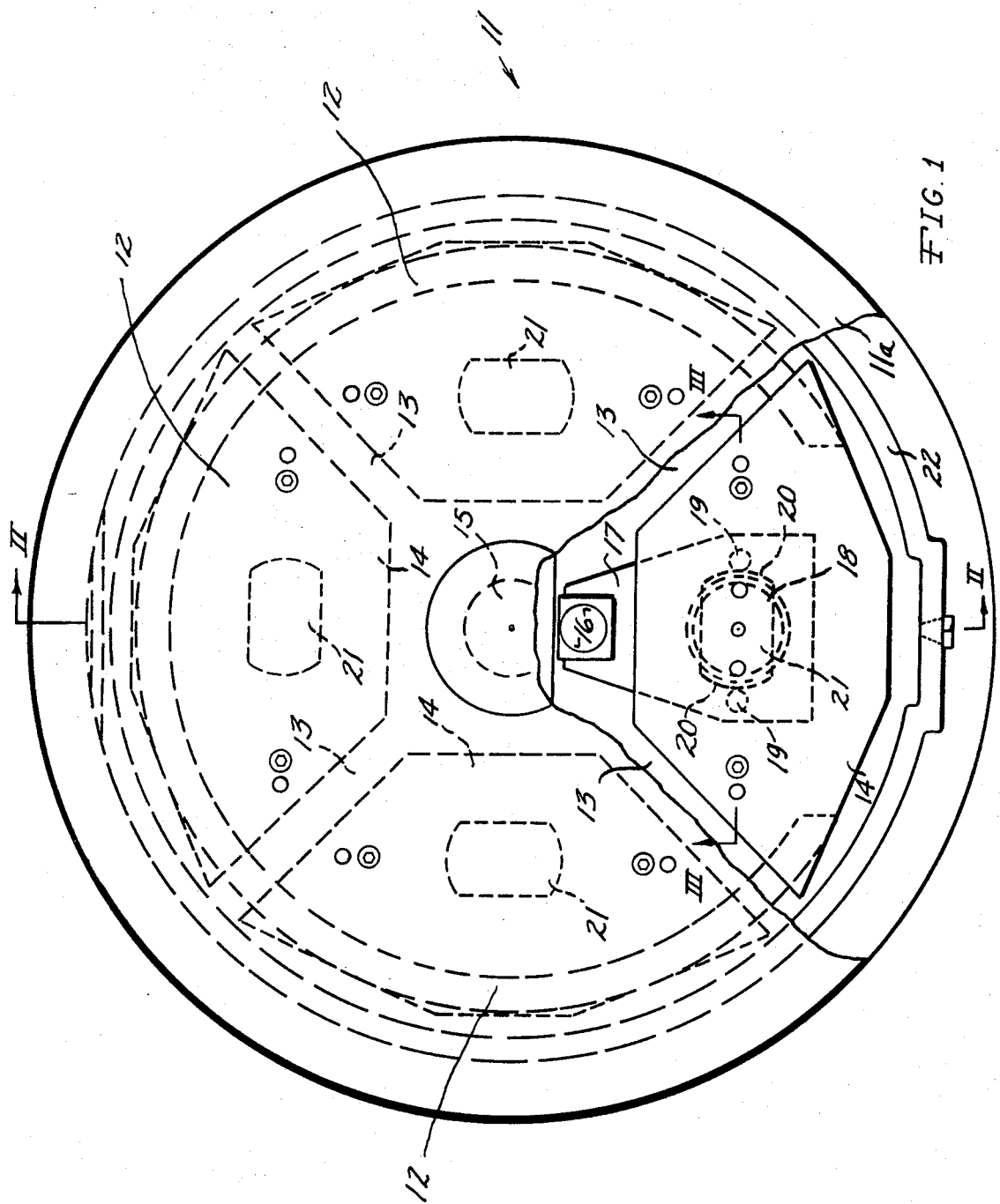
FIG. 1 is a top plan view of an indexing table in accord with the present invention and partially cut away to reveal the indexing camming device ramps and drive arm, the lock barrier engaged transitionally on cessation of drive at both sides of a dwell position.

In general, the device of the present invention comprises a round table, a base which supports the table top, journalling arrangements whereby the table is supported above the base while being rotatable in a control journal through the base, a motor as for example, an electric motor and a gear or worm drive, a drive head on a vertical shaft and the shaft being operably connected to the drive elements and for movement therewith, actuator means which may be a roller cam as shown for causing angular rotational displacement of the table during a portion of the rotation of the drive head, and lock means engagable in straddling abutting relation and active only through certain arcuate travel of the drive head. Where a worm gear or geared drive transmits power to the shaft of the drive head, the same shaft can provide control means for monitoring disconnect of the motor. Alternatively the reduced load on the motor can serve to disconnect the motor during dwell and then the motor can be reconnected when a work at the station has been completed. The electrical control circuitry is not a part of the present invention but those skilled in the art will readily appreciate several common means for motor disconnect during dwell where the dwell period necessarily exceeds the time required for the index means to enter the radial indexing paths and for the lock path to have reached the "unlock" position. Two basic versions of the invention are shown.

Firstly, the drive head may include an indexing actuator or roller and a pair of lock pins (which may be blocks, shoes or rollers) concenrric to and flanking the drive axis of the drive head. Secondly, the drive head may have a camming surface partially concentric about the drive axis and in straddling lock engagement with table depending pins, blocks or shoes. In both instances the indexing actuator or roller at lock release enters the index path between integral or non-integral cam blocks so that as rotation of the drive head occurs corresponding rotation of the table occurs on its separate axis. In this manner the table is always under control by the indexing or cam roller moving outward and inward between pairs of cam blocks or in the balance of one full rotation of the drive head under locked position. The lock is accordingly coordinated with the indexing motion and lock control is maintained against forward inertial thrust or backlash and "bounce" experienced using prior art physical blocking means. The stop action is accordingly smooth and th pick-up action is fast through one index cycle at a time, the index actuator or roller moving into the cam groove at unlock in a slow transition, then moving through a relatively rapid traverse and back to slow movement at relock. The result is a reliable simplified Geneva type rotary indexing table having a plurality of work stations wherein an indexing path is coordinated with a locking path, both paths being coordinated and established by a single drive plate so that a straddle lock occurs on the perimeter of a circular surface locking the table against motion through less than 180° and undergoing index camming motion for the angular distance greater than 180° so that positive engagement of drive to table occurs in a simple manner through 360° of drive head or drive plate motion.

SPECIFIC DESCRIPTION

With reference to the drawings and with particular reference to FIG. 1 thereof, a rotary indexing table 11 having a plurality work station 12 is shown and the rotatable table 11 is cut away to reveal radial indexing paths 13 as between cam blocks 14, each secured or integrally provided beneath the work stations 12 and movable with the table 11. The cam blocks 14 terminate short of contact with shaft 15 upon which the table 11 turns and this provides clearance space for the actuator 16 such as the illustrated roller on the end of the drive plate or arm 17. The drive head or arm 17 rotates on its axis as represented by the shaft 18. Hence, the drive arm or drive head 17 is an eccentric or crank arm as respects the actuator or roller 16. A pair of lock pins 19 which may be blocks, shoes or anti-friction roller elements provide straddling lock surfaces engagable with the corresponding arcuate surfaces 20 of stop element 21. The shaft 18 is journalled in the base or frame 22 which, as will be seen, provides bearing support for the table 11 and is in support of the table shaft 15 and also the drive elements not seen in the FIG. 1.

Rotation of the drive head 17 by the drive means generates two paths. One path is generated by the concentric movement of the pins or rollers 19 around the shaft 18. This can be viewed as a lock trace path since during a portion of a complete drive cycle, the pins 19 are astraddle the stop element 21 against the correspondingly arcuate surfaces 20 so that the table 11 and cam blocks 14 cannot move. The second path is also concentric about the shaft 18 and is generated by the axis of roller 16 moving concentric to shaft 18 and movement of the roller 16 in relation to table 11 and reciprocates, as will be seen, during part of its travel in engagement in the moving radial index paths 13. Hence, as will be seen, during one complete revolution of the shaft 18, the drive head 17 locks the table 11 against movement because the pins 19 are astraddle the stop element 21. Then in the same revolution the roller 16 enters the radial indexing channel or path 13 between adjacent cam blocks 14 and moves the work station 12 in a clockwise or counterclockwise direction depending upon the corresponding direction of rotation of the dirve head 17 on shaft 18. As motion commences in the table 11, the pins 19 have released their straddle hold on the stop element 21 relinquishing table control to the index roller 16, and the roller 16 being secure in its control over the table 11 by its anit-friction fit in the radial path 13 maintains control until pins 19 again gain control at the end of index motion. Relock occurs, as will be seen, when the roller 16 traverses the path 13 to return and tangentially exits therefrom as the drive arc continues. At that time the pins or rollers 19 again are found astraddle the next adjacent block 21. Dwell occurs while the table 11 is locked and this may be used as a position in which to stop the drive power or in some instances the dwell is adequate for accomplishing some work at any or all work stations 12 prior to repetition relocation. All inertial functions of the table are under careful control and are ideally suited for motor indexing. While a four station system is shown, other numbers of stations may be accommodated, limited only by the manipulative clearance requirements of the table geometry.

FIG. 2 shows the power package 23 including motor and gearing or reducer suspended beneath the case 22 and drivably connected to the drive shaft 18. The drive shaft 18 extends into the case 22 and drivably moves the drive plate or head 17. The shaft 18 is positioned in the bearing 24. The indexing roller 16 is secured in eccentric relation to the drive arm or head 17 which projects upwardly in the cavity 25 of the case 22 on an interference level with the cam blocks 14. The cam blocks 14 may be integral with the rotating table top 11a. The number of cam blocks 14 are equal to the number of index stations 12 and the cam blocks 14 depend into the cavity 25 of the case 22 separated from each other to form the radial index paths 13 as seen best in FIG. 1. The case 22 also provides bearing support for the center pivot of the table 11 on the center shaft 15.

The case 22 also provides bearing support at surfaces 26 for cam blocks 14 which in turn supports the loading of the table. These may be roller or other anit-friction bearings as desired in any particular application. The cap 29 provides a thrust stop securing the table top 11a to the shaft 15.

The stop elements 21 are secured in depending relation to the cam blocks 14 and together with lock pins, blocks or shoes 19 (seen in FIG. 1) cooperate to provide positive locking of the table during dwell.

A small peripheral air gap 30 between case 22 and table is preferred and may also include journal means, but allows the cavity 24 to run sufficiently full of lubricant to lubricate surfaces 26 where this is desired.

The drive shaft 18 extends beneath the power package 23 and a cam 31 may be secured thereto for operation of a limit switch 32 to provide a cantrol element operative, for example, during dwell to interlock the index table with other operations or to monitor position of the table 11 for interrupting the table drive during dwell for a prolonged dwell period. The cam 31 and limit switch 32 are shown in an unengaged position in the FIG. 2 and they may be engaged as operationally required. The electrical controls form no part of the present invention but the limit switch 32 is included herein to indicate that during dwell while the lock pins, blocks or shoes 19 are engaged, a total timed disconnect of power may be actuated without any overrun from inertia and the table 11 control may accordingly be integrated as a part of any machine tool or process operation since the position of the shaft 18 directly reflects the lock condition during dwell.

In FIG. 3 the structure seen in FIG. 2 is elaborated from a different direction to the locked condition for the table 11 by reason of the anti-friction lock pins 19 astraddle the stop element 21 and where the pins, blocks or shoes 19 are in rolling or sliding contact with the arcuate surface of the stop 21. The pins, blocks or shoes 19 are secured to the drive arm 17 in spaced apart concentricity around the shaft 18.

In FIG. 4 a somewhat schematic presentation of the structure of FIGS. 1, 2 and 3 is shown and which best illuminates the simplicity of the structure 11. The circular table top 11a is seen to include the center shaft 15 on which the table 11a rotates, a plurality of depending cam blocks 14 in accord with the number of work stations 12 (FIG. 1) and each of the blocks 14 includes a depending stop element 21 having arcuate surfaces 20 corresponding to the inner diameter of the pins, blocks, shoes or rollers 19. The pins, blocks or shoes 19 are seen in the assemblage of drive head 17 on the shaft 18. The roller 16 is mounted on the end of the drive plate 17 in th manner of a crank arm and projects, upon rotation in the radial index path 13, thereby moving the table 11a to the next station in an arcuate movement of the arm 17 of less than 360°. The case or base 22 providing fixed journal support for the table top 11a and mounting means for the power package 23 and control elements such as cam 31 and limit switch 32 are also seen in schematic relation beneath the table top 11a and operably securing the drive arm 17 therebetween.

FIG. 5 in plan schematic view shows the arm 17 moving in a counterclockwie direction, and with the path of roller 16 precisely tangent with the pathway 13. This entry of roller 16 to path 13 starts to move the table represented by the cam blocks 14 in a counterclockwise motion and the lock pins, blocks or shoes 19 have relieved the stop 21 so that the table is capable of movement. Continuing motion as seen in FIG. 6 accelerates to half traverse of the cam blocks 14 where the roller 16 is at its extreme of travel in he index path 13. Further rotation completes the indexing of cam block 14 and the table locks when tangential emergence of the roller 16 from the radial index path 13 occurs. In FIG. 6 the phantom line position of cam block 14 represents the dwell position. The full line cam blocks show the drive arm 17 as having moved halfway through its indexing motion. The lock block 21, centered at dwell, is now in its new halfway position as seen centered in full line version of cam blocks 14.

In FIGS. 7 and 8 a variation in construction is indicated wherein the cam blocks include depending lock pins, blocks or shoes 40 which could be rollers or roller bearings. These lock pins, blocks or shoes 40 are in tangential contact with an arcuate portion 41 of the drive arm 42. When the pins 40 are engaged with the arcuate portion 41 the straddle relation prevents movement of the table 43 as indicated by the cam blocks 44. The radial index pathway 45 between the cam blcoks 44 is substantially the same as in the construction of FIGS. 1–6 inclusive and the roller 46 on the arm 42 describes an arc so that the roller is tangent with the walls of the radial groove or path 45 thus assuring smooth entry and exit and concurrent release of the pins 40 from the arcuate stop surface 41. Hence the table 43 is in continuous movement control by either the roller 16 in grooves 45 or the pins, blocks or shoes 40 are engaged against the surface 41 during all positions of the drive arm 42. The pivotal center of the table 43 is indicated by the shaft 47. The drive shaft 48, as will be appreciated, is powered by a motor and/or geared drive, not shown. The usual and preferred drive is by a worm and worm gear.

The FIG. 8 shows the table 43 with depending cam blocks 44 defining therebetween the radial index slots, grooves or paths 45. Fixed to and depending from the cam blocks 44 are pins, blocks or shoes 40 which are in concentric spaced relation around the shaft 48 when engaged with the arcuate surface 41 holding table 43 locked while roller 46 is not engaged with paths 45.

In operation the tables made in accord with the foregoing description are reasonably inexpensive to fabricate relative to competing devices and operate smoothly without separate timed shot pins and physical blocking arrangements separated from the drive. The movement of the table is controlled in locked and moving phases by the same agency and at the transition between locking and movement or movement and locking the amount of backlash is minimal. This extends the life of the drive system and assures repetitive positioning accuracy.

Having thus described my invention, other skilled in the art will appreciate improvements and modifications therein and such improvements and modifications are intended to be included herein limited only by the scope of my hereinafter appended claims.

I claim:

1. In a Geneva type rotary indexing table including a plurality of equally spaced radial indexing paths attached beneath a work surface and a single drive plate including an indexing actuator sequentially moving said radial indexing paths and attached index table through an increment of angular motion, the combination which comprises:

dual vertical lock pins on said drive plate in fixed spaced apart relation, the sides of which said pins are engagable with the perimeter of a circular surface depending from said work surface, the center point of said perimeter equidistant from each lock pin whereby the table is always locked by the lock pins through less than 180° of motion of the drive plate and with indexing by the indexing actuator through greater than 180° of motion of the drive plate and wherein the table is positively engaged through 360° of drive plate motion.

2. A Geneva type rotary indexing table as in claim 1 where the equally spaced radial indexing paths are formed by a plurality of equally spaced apart cam blocks secured in separate relation beneath the index table work surface with adjacent surfaces parallel.

3. A rotary indexing table of the Geneva type having a plurality of work stations and comprising:

a round table having a plurality of spaced apart equidistant radial index paths defined in the underside thereof and stop surfaces intermediate said radial index paths;

a fixed base journalling said table at the axis thereof and supporting thrust loading of said table;

a drive plate extending through said base and including an actuator eccentrically attached to one end thereof and lock surfaces on said drive plate providing lock means concentric about the drive axis of said drive plate and selectively engagable with said stop surfaces provided on said round table intermediate said radial index paths to provide dwell at the work stations; and drive means operably connected to said drive plate whereby said plate in rotation indexes said table by engagement of said index actuator in said radial paths through greater than 180° and thereafter locking during dwell by straddle engagement of said stop surfaces with said lock surfaces for less than 180° of drive plate travel and wherein the table is positively engaged through a full 360° of drive plate motion.

* * * * *